US011032791B2

(12) United States Patent
Laufer et al.

(10) Patent No.: US 11,032,791 B2
(45) Date of Patent: Jun. 8, 2021

(54) METHOD AND SYSTEM FOR DYNAMICALLY ADJUSTING COMMUNICATION CHARACTERISTICS OF SATELLITE COMMUNICATION LINKS BASED ON WEATHER NOWCASTING

(71) Applicant: Advantech Wireless Ltd., Netanya (IL)

(72) Inventors: Shaul Laufer, Petach Tikva (IL); Yaakov Kreisler, Givat brener (IL)

(73) Assignee: Advantech Wireless Ltd., Netanya (IL)

( * ) Notice: Subject to any disclaimer, the term of this patent is extended or adjusted under 35 U.S.C. 154(b) by 0 days.

(21) Appl. No.: 15/113,067

(22) PCT Filed: Jan. 22, 2015

(86) PCT No.: PCT/IL2015/050073
§ 371 (c)(1),
(2) Date: Jul. 21, 2016

(87) PCT Pub. No.: WO2015/111050
PCT Pub. Date: Jul. 30, 2015

(65) Prior Publication Data
US 2017/0013587 A1    Jan. 12, 2017

(30) Foreign Application Priority Data
Jan. 22, 2014 (IL) ......................... 230604

(51) Int. Cl.
*H04B 7/185* (2006.01)
*H04W 16/18* (2009.01)
(Continued)

(52) U.S. Cl.
CPC ........ *H04W 64/003* (2013.01); *H04B 7/1858* (2013.01); *H04B 17/373* (2015.01);
(Continued)

(58) Field of Classification Search
CPC . H04W 64/003; H04W 16/18; H04W 52/242; H04W 24/10; H04W 64/00;
(Continued)

(56) References Cited

U.S. PATENT DOCUMENTS 6,308,043 B1    10/2001   Solheim et al.
6,587,687 B1 *   7/2003   Wiedeman ......... H04B 7/18513
                                                  455/428

(Continued)

FOREIGN PATENT DOCUMENTS

| EP | 0837569 | 4/1998 |
| EP | 1763154 | 3/2007 |
| JP | 2005 321235 | 11/2005 |

OTHER PUBLICATIONS

Wikipedia, Attenuation, 2013, https://web.archive.org/web/20131126150032/http://en.wikipedia.org/wiki/Attenuation.*
(Continued)

*Primary Examiner* — Jianxun Yang
(74) *Attorney, Agent, or Firm* — Pearl Cohen Zedek Latzer Baratz LLP

(57) ABSTRACT

A method and system for adjusting satellite communication network based on weather nowcasting are provided herein. The method may include: receiving weather conditions within a specified geographic region from a plurality of sources; obtaining positions of at least one terrestrial terminal within said specified area and a position of a communication satellite being in communication with said at least one terrestrial terminal; generating nowcasting predictions of weather conditions in a plurality of locations along communication paths between said communication satellite and said at least one terrestrial terminals, based on the received weather conditions; calculating total signal attenuation integral along said communication paths, over time, based on said nowcasting predictions; and dynamically adjusting communication characteristics of the at least one terrestrial terminal according to the calculated total signal attenuation.

20 Claims, 6 Drawing Sheets

(51) Int. Cl.
   *H04W 52/24* (2009.01)
   *H04W 64/00* (2009.01)
   *H04B 17/373* (2015.01)
   *H04B 17/391* (2015.01)

(52) U.S. Cl.
   CPC ........ *H04B 17/3913* (2015.01); *H04W 16/18* (2013.01); *H04W 52/242* (2013.01)

(58) Field of Classification Search
   CPC .............. H04B 17/373; H04B 17/3913; H04B 7/18513; H04L 1/0026; H04L 1/0003; H04L 67/16; H04L 1/0001; H04L 1/0015; H04L 1/06; G01W 2203/00; G01S 5/14
   See application file for complete search history.

(56) References Cited

U.S. PATENT DOCUMENTS

| | | | | |
|---|---|---|---|---|
| 2003/0200027 | A1* | 10/2003 | Root | G01W 1/00 |
| | | | | 702/3 |
| 2004/0043760 | A1* | 3/2004 | Rosenfeld | H04L 67/16 |
| | | | | 455/414.3 |
| 2005/0143013 | A1* | 6/2005 | Jha | H04L 1/0001 |
| | | | | 455/69 |
| 2012/0081249 | A1* | 4/2012 | Kaiser | G01S 5/14 |
| | | | | 342/174 |
| 2012/0127921 | A1 | 5/2012 | Laufer | |
| 2012/0188880 | A1 | 7/2012 | Beeler | |
| 2013/0114442 | A1* | 5/2013 | Park | H04B 7/18513 |
| | | | | 370/252 |

OTHER PUBLICATIONS

IMOC_2009_Rain_Attenuation, Mello et al, IEEE, 2009 (Year: 2009).*
Link budget, Wikipedia, 2013 https://web.archive.org/web/20130911155120/https://en.wikipedia.org/wiki/Link_budget (Year: 2013).*
Fade simulation, Basarudin, 2012 https://hydra.hull.ac.uk/assets/hull:5774a/content (Year: 2012).*
International Search Report for PCT application No. PCT/IL2015/050073 dated Apr. 27, 2015.
Gerard Maral , VSAT Networks, John Wiley & Sons Ltd., West Sussex, England, $2^{nd}$ Edition, 2003.
Search Report dated Sep. 22, 2017 for corresponding European Patent Application No. EP15740315.5.

* cited by examiner

*400*

410 — RECEIVING WEATHER DATA RELATED TO A SPECIFIED GEOGRAPHIC AREA FROM AT LEAST ONE SOURCE

420 — OBTAINING A POSITION OF AT LEAST ONE TERMINAL LOCATED IN THE SPECIFIED AREA AND A POSITION OF A COMMUNICATION SATELLITE BEING IN COMMUNICATION WITH SAID TERMINAL

430 — GENERATING NOWCASTING PREDICTIONS OF WEATHER CONDITIONS IN A PLURALITY OF ESTIMATED FUTURE LOCATIONS ALONG COMMUNICATION PATHS BETWEEN SAID COMMUNICATION SATELLITE AND SAID TERMINAL, BASED ON THE RECEIVED WEATHER DATA AND THE OBTAINED POSITIONS

440 — CALCULATING A PREDICTED SIGNAL ATTENUATION INTEGRAL ALONG SAID COMMUNICATION PATHS, BASED ON SAID NOWCASTING PREDICTIONS

450 — DYNAMICALLY ADJUSTING COMMUNICATION CHARACTERISTICS OF COMMUNICATION LINKS ALONG RESPECTIVE COMMUNICATION PATHS, ACCORDING TO THE CALCULATED PREDICTED SIGNAL ATTENUATION INTEGRAL

460 — MEASURING ACTUAL SIGNAL ATTENUATION OVER A RETURN CHANNEL AND VALIDATING THE NOWCASTING PREDICTIONS AND THE ATTENUATION INTEGRAL MODEL PARAMETERS WITH THE MEASURED SIGNAL ATTENUATION, TO YIELD CALIBRATED ATTENUATION INTEGRAL PREDICTIONS

Figure 4

METHOD AND SYSTEM FOR DYNAMICALLY ADJUSTING COMMUNICATION CHARACTERISTICS OF SATELLITE COMMUNICATION LINKS BASED ON WEATHER NOWCASTING

CROSS-REFERENCE TO RELATED APPLICATIONS

This application is a National Phase Application of PCT International Application No. PCT/IL2015/050073, International Filing Date Jan. 22, 2015, entitled: "METHOD AND SYSTEM FOR DYNAMICALLY ADJUSTING COMMUNICATION CHARACTERISTICS OF SATELLITE COMMUNICATION LINKS BASED ON WEATHER NOWCASTING", published on Jul. 30, 2015 as International Patent Application Publication No. WO 2015/111050, claiming priority of Israel Patent Application No. 230604, filed Jan. 22, 2014, which is hereby incorporated by reference in its entirety.

FIELD OF THE INVENTION

The present invention relates generally to the field of satellite communication and more particularly to adjusting communication of satellites based on nowcasting.

BACKGROUND OF THE INVENTION

Prior to setting forth a short discussion of the related art, it may be helpful to set forth definitions of certain terms that will be used hereinafter.

The term "nowcasting" as used herein, is defined as the forecasting of the weather within the next six hours. In this time range it is possible to forecast smaller features such as individual showers and thunderstorms with reasonable accuracy, as well as other features too small to be resolved by a computer model. A human given the latest radar, satellite and observational data will be able to make a better analysis of the small scale features present and so will be able to make a more accurate forecast for the following few hours.

The term "Ka band" as used herein, covers the frequencies of 26.5-40 GHz. The Ka band is part of the K band of the microwave band of the electromagnetic spectrum. The 30/20 GHz band is used in communications satellites, i.e. uplink band is 27.5-31 GHz and downlink band is 17.7 GHz-22 GHz.

The term "adaptive coding and modulation" or ACM, as used herein, is defined in wireless communications to the matching of the coding and modulation to the conditions of the radio link (e g the path loss, the interference due to signals coming from other transmitters, the sensitivity of the receiver, the available transmitter power margin, and the like. For brevity, modulation and coding is referred herein as ModCod.

The term ACM margin, as used herein, is defined is the signal to noise ratio (SNR) difference, in dB between two different ModCod levels of a communication link. A communication link having ModCod level of 8, for example, may have an ACM margin of, for example, 4 dB with respect to a ModCod level of 12. The higher the ModCod level, the less robust the communication link is. Therefore, reducing the MoCod is a measure that may be taken in order to address signal attenuation along the communication link.

In satellite communication, one of the challenges is to determine in real-time, a degradation of the communication channel. This degradation is usually atmospheric in nature and is mainly due to weather-based attenuations. Attempting to deduce the accumulated attenuation along the communication channel via the satellite communication link parameters provide poor results due to the long delay between the attenuation and its detection or prediction based on the communication link parameters. The aforementioned delay including propagation, processing and measuring times, may accumulate to 2-4 seconds where the attenuation rate can be as fast as 1.5 dB per second.

Coping with changing weather conditions usually requires employing high power margins, of the order of 3-6 dB, in order to reduce the probability of links cut offs, even if ACM is employed, due to the fast and large changes in the fading and the slow response of the closed loop ACM mechanism. This required margin is too expensive in resources terms.

Currently available systems are limited to measuring attenuation in real time only. Future communication path attenuation is not addressed. Therefore it would be advantageous to be able to provide short term future prediction of communications path attenuation in order to timely adjust the communications characteristics of the communication link and thereby reducing the overall resources usage of the satellite network.

SUMMARY OF THE INVENTION

The present invention, in embodiments thereof, addresses the challenge of predicting and remedying attenuation along communication links in a satellite communication networks using short term weather prediction which is referred to as nowcasting. Using various sources, a nowcasting model is being generated which is applied, for computational efficiency reasons, only to the portions in the three dimensional sector or region through which the communication links of the satellite network are active. Then, using a weather-to-attenuation mapping, the nowcasting predictions are converted into attenuation predictions. Then, for each monitored communication link in the network, an attenuation integral is calculated along the communication link path (usually the atmospheric portion contributes most or all of the attenuation). Once an accumulated attenuation over a predefined threshold is detected, the communication parameters of that communication link are adjusted to overcome the attenuation.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 4 is a high level flowchart diagram illustrating aspects of methods in accordance with some embodiments of the present invention;

Figure 1:
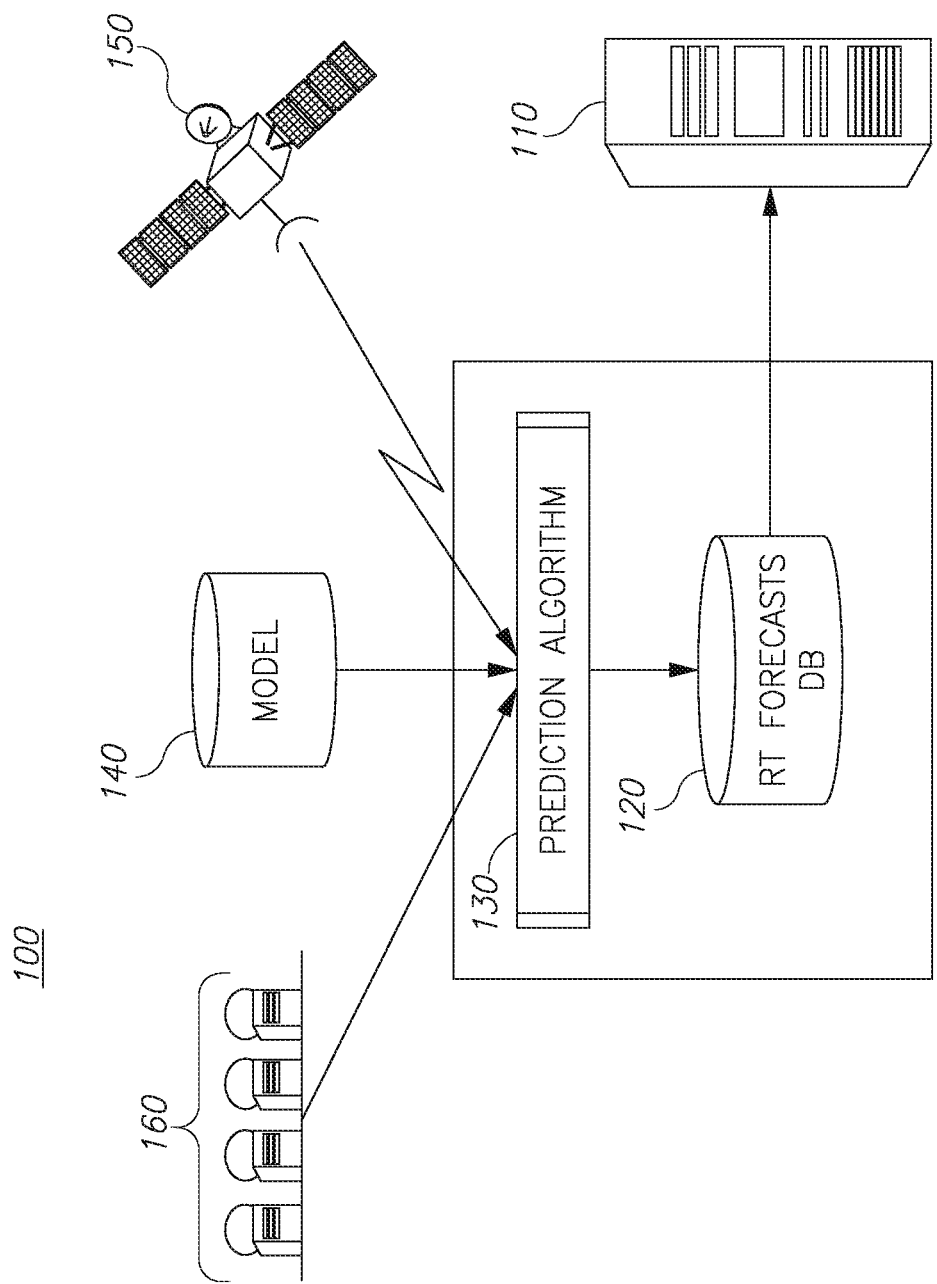
FIG. 1 is a high level schematic diagram illustrating an aspect of a system in accordance with some embodiments of the present invention.

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a block diagram illustrating a system according to some embodiments of the present invention. Stationary weather radars 160 as well as weather satellites 150 may be used as sources for periodic weather forecasting. Using a mathematical model 140, a nowcasting prediction algorithm 130 is applied to the weather data, to yield a real-time forecast database 120 which stores the nowcasting predictions that are being used by control server 110 which is in the focus embodiments of the present invention.

Figure 2:
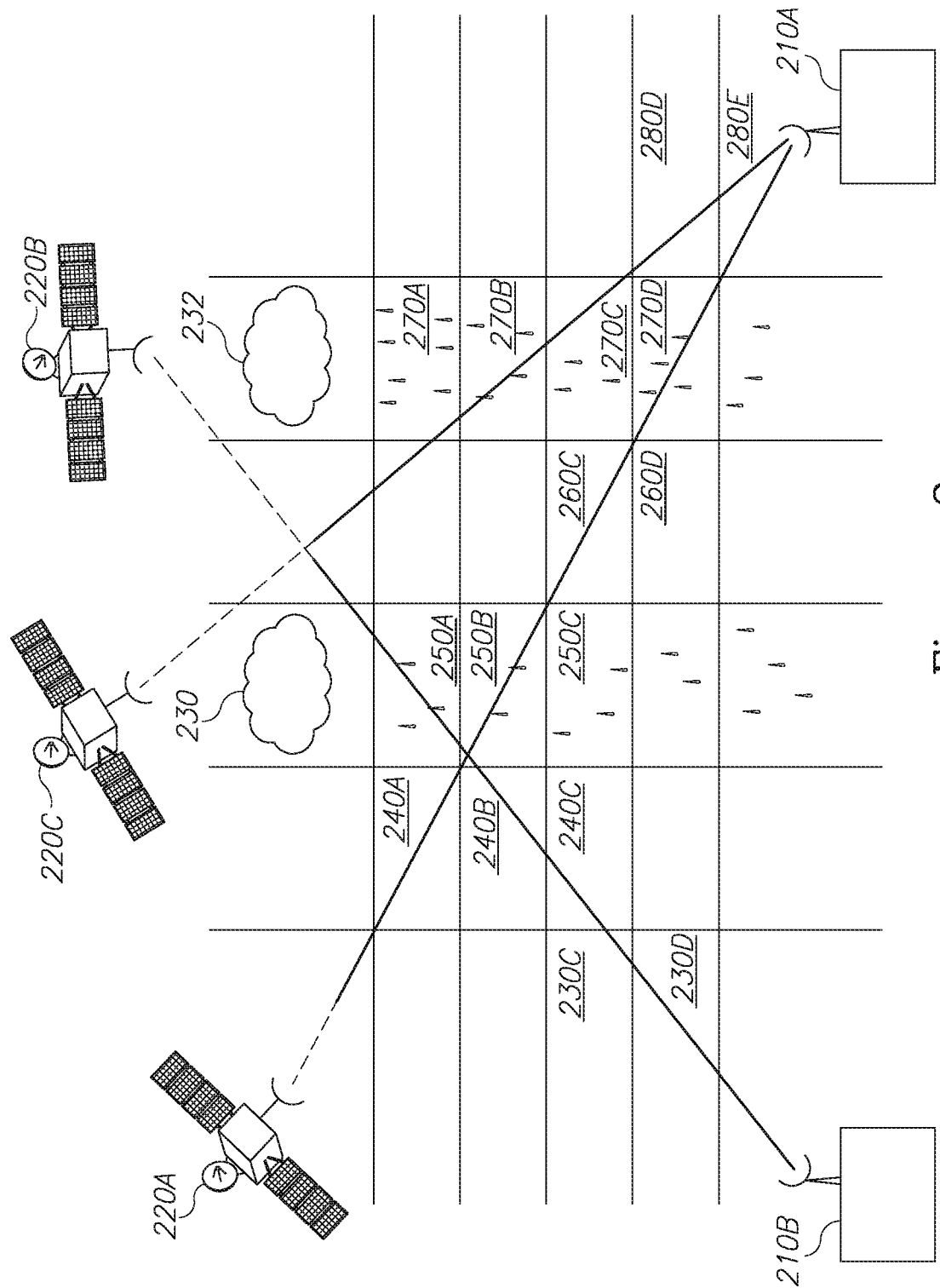
FIG. 2 is a high level schematic diagram illustrating another aspect of a system in accordance with some embodiments of the present invention.

FIG. 2 is a high level schematic diagram illustrating another aspect of a system in accordance with some embodiments of the present invention. Pluralities of communication satellites 220A-220C are in communication links with terrestrial stations 210A and 210B. Each communication links can be defined as a three dimensional vector passing through the atmosphere where, in a three dimensional representation, the vector passes through a plurality of cubes. For example, the downlink channel from satellite 220B to terrestrial station 210B passes through cubes 250A, 240B, 240C, 230C and 230D. Only these cubes which are contained within the atmosphere may affect the attenuation due to weather conditions. Specifically, due to cloud cluster 230, cube 250A is affected and so the attenuation of the vector communication link can be measured and accumulated. The process of measuring the accumulated attenuation can be similarly calculated for all links by first determining the cubes, then extracting the corresponding nowcasting parameters and then applying a transformation from precipitation to attenuation as will be detailed further below.

In one implementation, the system may include a weather collection module configured to receive weather data related to a specified geographic area from at least one source; position collection module configured to obtain a position of at least one terminal located in said specified area and a position of a communication satellite being in communication with said terminal; nowcasting prediction module configured to generate nowcasting predictions of weather conditions in a plurality of estimated future locations along communication paths between said communication satellite and said terminal, based on the received weather data and the obtained positions; a computer processor configured to calculate a predicted signal attenuation integral along said communication paths, based on said nowcasting predictions; a control center configured to dynamically adjust communication characteristics of communication links along respective communication paths, according to the calculated predicted signal attenuation integral.

Figure 3:
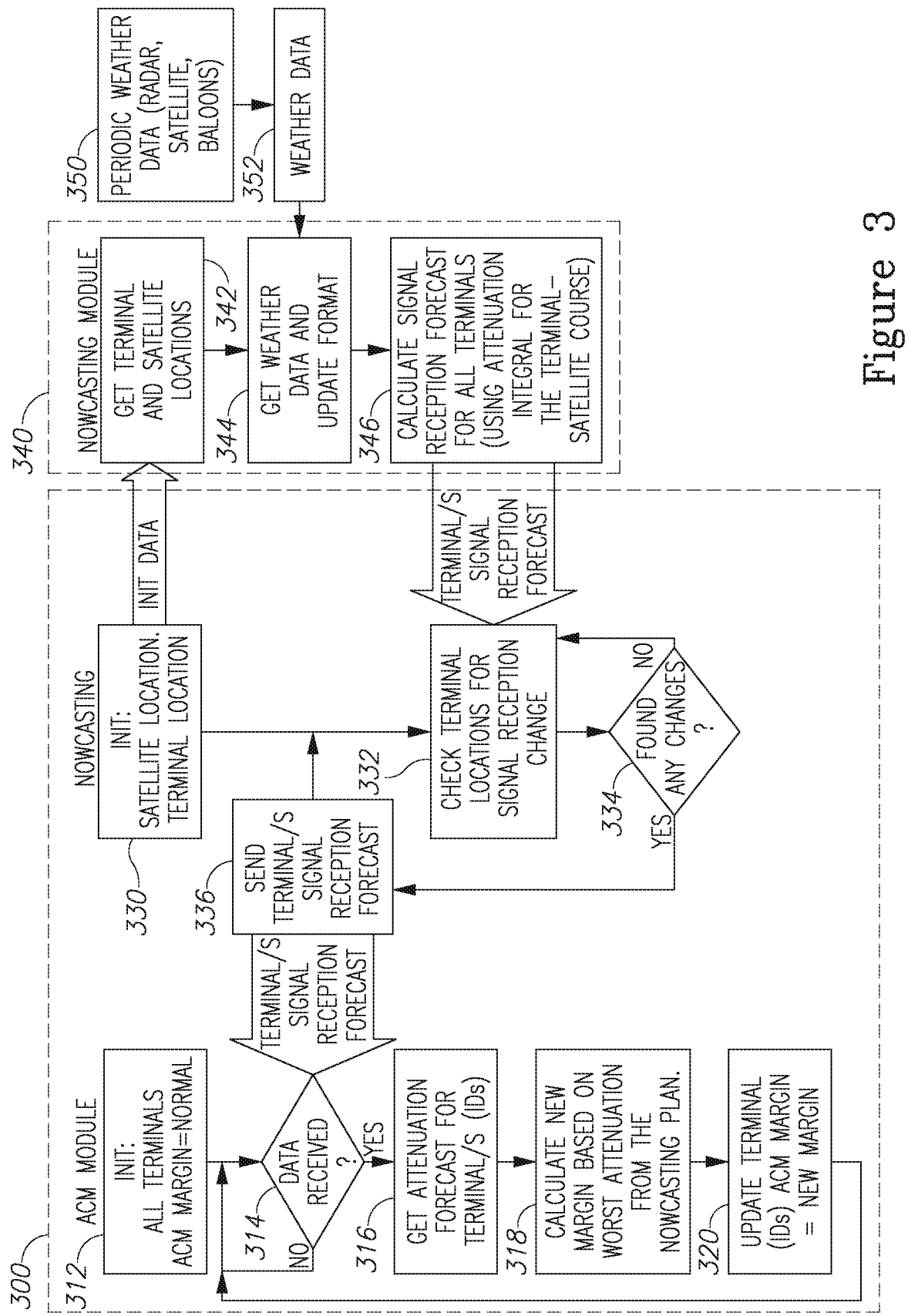
FIG. 3 is a high level block diagram illustrating yet another aspect of a system in accordance with some embodiments of the present invention.

FIG. 3 is a high level block diagram illustrating yet another aspect of a system 300 in accordance with some embodiments of the present invention. As explained above periodic weather data is acquired from various sources 350. In a nowcasting module terminal (terrestrial stations) and satellite location are collected 340. Weather data 352 is then collected and brought into an updated format 342. Then the signal reception forecast for all terminals is being calculated using an attenuation or precipitation integral for the terminal-satellite course 344 (the aforementioned vector).

Referring the nowcasting process, the satellites locations as well as the terminals locations are initialized 330. Then, in an iterative process, the terminals locations are checked for signal reception change 332 in view of the forecast 344. In case any change is found 334, terminal signal reception forecast is sent 336 to the main server which includes an adaptive coding and modulation (ACM) module 312 which first initializes all terminals (each associated with an ID number) with a preset ACM margin. Once data indicative of attenuation change beyond a predefined threshold in one or more communication links is received 314, the attenuation forecast for the terminal per ID is received 316. Then a new margin for each affected terminal is calculated based on worst attenuation, based on the corresponding nowcasting parameters 318. Then, new terminal (per ID) ACM margin is updated into the new value, as determined 320. This process is then ready to receive new updates regarding changes in the terminals (per ID) reception which again initialize in turn the process of determining a new ACM margin for at least some of the terminals.

According to some embodiments, once a specified ACM margin for a terminal that is likely to be affected by weather conditions has been allocated, this ACM margin is being maintained by continuously updating the ModCod by the ACM mechanism according to link quality measurements fed back. This way, the robustness of the affected terminal to fast variations is assured.

FIG. 4 is a high level flowchart diagram illustrating aspects of a method 400 in accordance with some embodiments of the present invention. Method 400 may include the following stages: receiving weather data related to a specified geographic area from at least one source 410; obtaining a position of at least one terminal located in said specified area and a position of a communication satellite being in communication with said terminal 420; generating nowcasting predictions of weather conditions in a plurality of estimated future locations along communication paths between said communication satellite and said terminal, based on the received weather data and the obtained positions 430; calculating a predicted signal attenuation integral along said communication paths, based on said nowcasting predictions 440; and dynamically adjusting communication characteristics of communication links along respective communication paths, according to the calculated predicted signal attenuation integrals 450.

According to some embodiments of the present invention, a central control unit is aware, at every point of time, which of the terminals has been allocated with an ACM margin. Their number, location as well as other parameters such as Quality of Service (QoS) requirements and the service-level agreement (SLA) are being processed centrally and further adjustments to the margins can be made accordingly, in a centralized manner, taking into account the ACM margin in resource terms. E.g. large ACM margin consumes more satellite resources (bandwidth and power). A user with low priority may not be entitled for full compensation and will have to either suffer some disconnections due to insufficient margin or will have to reduce traffic rate to allow full compensation.

According to some embodiments of the present invention, the method may further include a step of measuring actual signal attenuation over a return channel and validating the nowcasting predictions and the attenuation integral model parameters with the measured signal attenuation, to yield calibrated attenuation integral predictions 460.

According to some embodiments of the present invention, the terminals, and the communication satellites alone or in combination may be dynamic over time. Their mobility is monitored so that the prediction may be carried out taking into account their future position.

According to some embodiments of the present invention, the communication satellite being in communication with said at least one terrestrial terminal communicates over a Ka band channel.

Figure 5:
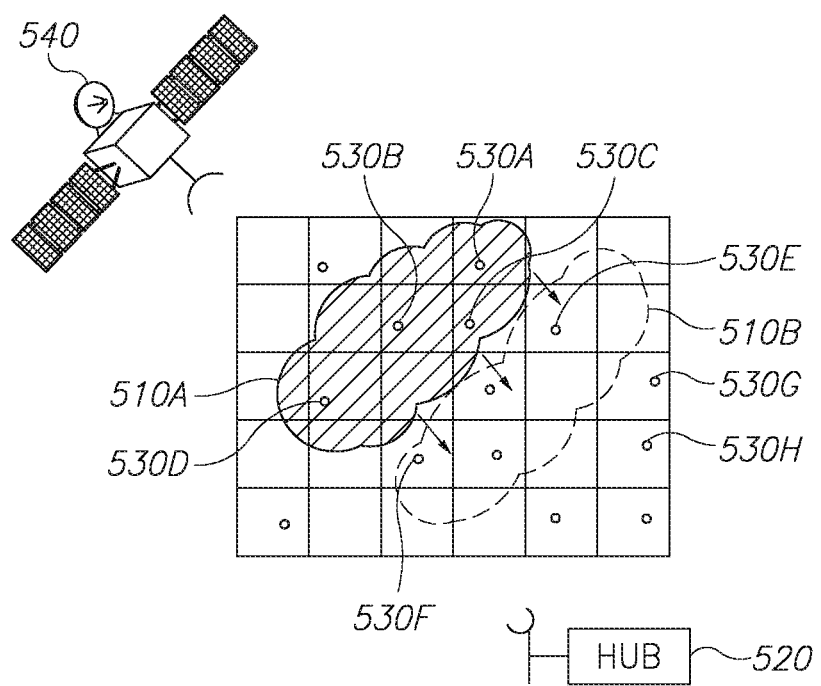
FIG. 5 is a diagram illustrating an aspect in accordance with some embodiments of the present invention.

FIG. 5 is a diagram of a network of terrestrial stations 530A-530H in communication with a satellite 540. A control unit, e.g., hub 520 receives the attenuation measurements, e.g., in signal to noise ratio (SNR) terms, from all terminals terrestrial stations 530A-530H which are corresponding to various communication links. According to some embodiments of the present invention, the central unit 520 may configured to track the changes in the attenuation level of all communication links, wherein each communication link is spatially linked to a geographical location. This way, the central unit can track the flow of the weather front in the region. In particular, movement of cloud 510A can be predicted to future location 510B. By first measuring the SNR at terminals 530A-530D when the cloud is in positions 510A and then measuring the SNR at positions 530E and 530F, the time the cloud reaches terminals 530G and 530H and affects them can be estimated and used as nowcasting predictions or general weather forecast to be used by nowcasting. The aforementioned tracking can serve as weather condition source of its own, so then nowcasting data can be autonomously generated eliminating the need for external weather prediction sources. Alternatively, this weather source can be fused with other weather sources for achieving improved accuracy of nowcasting. According to some embodiments of the present invention, the nowcasting predictions relate to a future temporal interval defined between 0 to 60 minutes from current time, either of the nowcasting is self-generated or provided by a third party.

Figure 6:
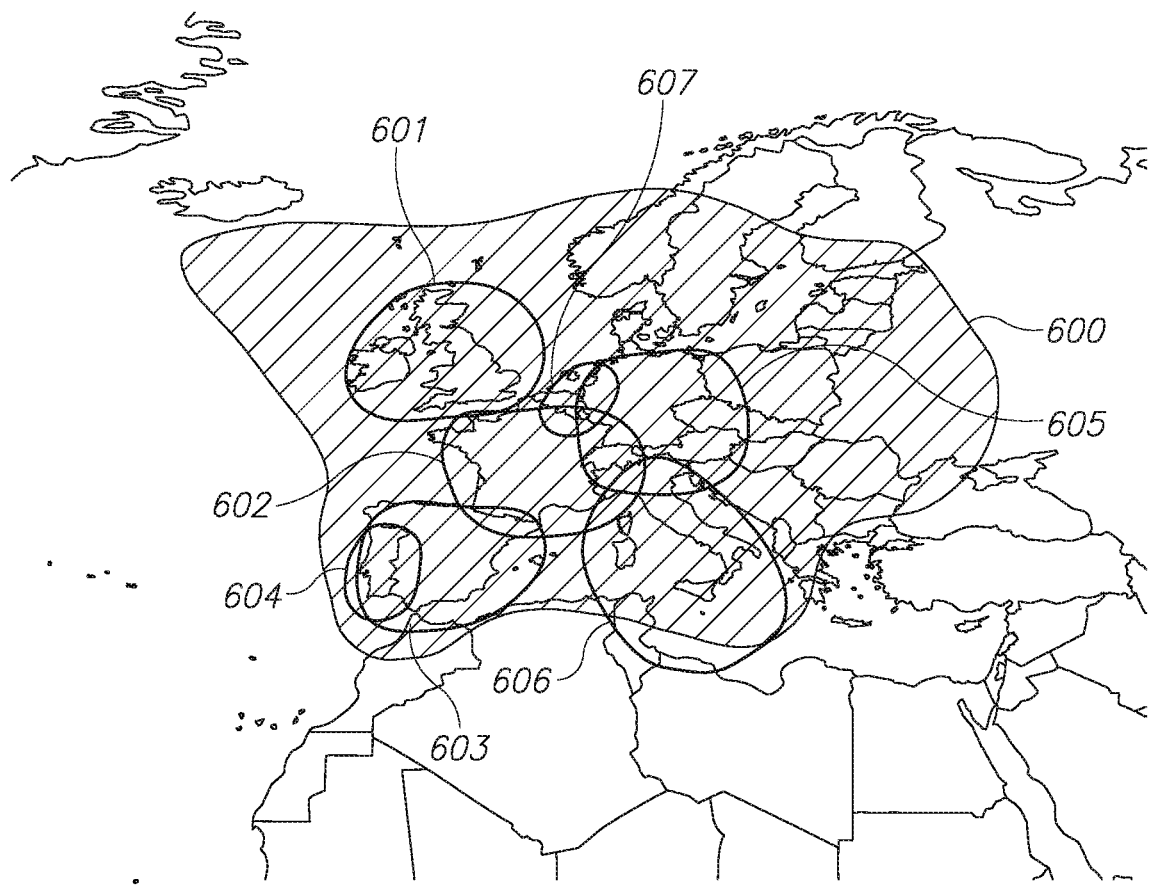
FIG. 6 is a diagram illustrating another aspect in accordance with some embodiments of the present invention.

FIG. 6 is a map illustrating a plurality of a broadcast coverage map 600 of a satellite with content unique regions 601-607 in which terrestrial terminals (not shown) are positioned. According to some embodiments of the present invention, when the communication is one way broadcasting and when the recipients of a specific portion of the content are confined to a specified geographical region, it is possible to first determine the weather conditions at that region using nowcasting, and then apply an ACM margin to that content, based on the worst weather conditions of a terminal at the specific region. For example—the content that is only addressed to French speaking recipients e.g., region 602 can be provided with the ACM margin based on the terminal with the worst predicted attenuation at region 602 (terminal not shown). In this manner, the broadcast ACM mechanism is content-aware and correlated with confined geographical regions thereby saving satellite resources while implementing a de facto return channel without really having such a return channel. The clear advantages provided herein are (a) that a different adaptive margin can be applied to each content correlated region thus improving the satellite resources utilization, and (b) no feedback is required for channel quality measurements as external weather conditions sources are used for nowcasting. Nevertheless, according to some embodiments, feedback of channel quality measurements can be used, if it is available, for adaptively deriving the ACM margins for the content correlated regions. According to some embodiments of the present invention, the dynamical adjusting of the communication characteristics may include adjusting modulation, coding, spreading, and power or any combination thereof.

Figure 7:
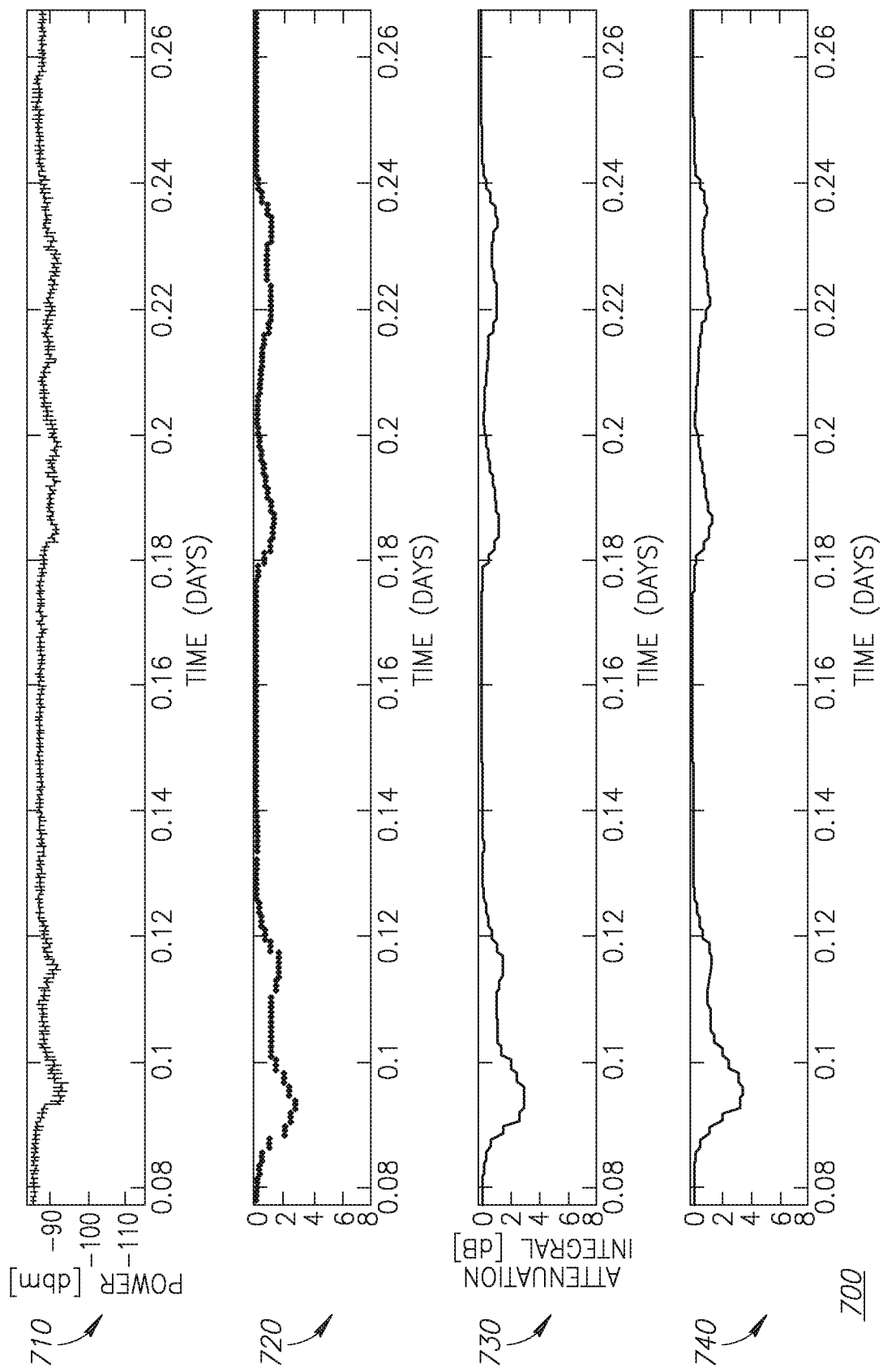
FIG. 7 is a graph diagram illustrating yet another aspect in accordance with some embodiments of the present invention.

According to a similar embodiment, the central unit can be content aware in broadcasting to a plurality of terminals. The ACM margin can be allocated to some of the content with a higher priority in SLA or QoS terms. For example, broadcasting of standard definition can be associated with an extra ACM margin whereas the high definition part of the same content (namely the additional content required to compose high definition) can be allocated with a lower ACM margin, so as to ensure SLA and QoS requirements while reducing resources consumption FIG. 7 is a graph diagram illustrating yet another aspect in accordance with some embodiments of the present invention. The following graphs were produced based on an actual experiment in which the downlink received signal was measured and compared with weather nowcasting predictions related to the same communication path. Graph 710 shows a power attenuation of the signal of the communication link over time as measured in real time at the terminal. Graph 720 shows attenuation of the communication link as calculated based on weather conditions as measured by weather radar in real time. Graph 730 shows attenuation of the communication link as predicted using a nowcasting algorithm based on weather conditions as measured by weather radar 3 minutes before said real time. Graph 740 shows attenuation the communication link as predicted using a nowcasting algorithm based on weather conditions as measured by weather radar 6 minutes before said real time. As can be seen, the measurements and the nowcasting predictions are well correlated and provide a proof of concept for the use of nowcasting to predict actual signal attenuation of a communication channel along estimated future communication path between said communication satellite and said terminal.

Following is a mathematical explanation of an exemplary precipitation-to-attenuation transformation that may be used in order to implement embodiments of the present invention. According to an exemplary implementation rain attenuation may be calculated from radar measurement of decibels relative to Z (dBZ). dBZ is a meteorological measure of equivalent reflectivity (Z) of a radar signal reflected off a remote object. The reference level for Z is 1 mm⁶ m⁻³, which is equal to 1 μm³. It is related to the number of drops per unit volume and the sixth power of drop diameter.

The dBZ values can be converted to rainfall rates in millimeters per hour using eq. (1) below:

$$R\left(\frac{mm}{hr}\right) = \left(\frac{10^{(dBZ/10)}}{200}\right)^{\left(\frac{5}{8}\right)} \quad (1)$$

The above equation is based on the most common form of Z-R relation for rain assuming a Marshal Palmer drop size distribution as in eq. (2) below:

$$Z = 200 R^{1.6} \quad (2)$$

The coefficients in eqs. (1) and (2) can vary according to location and time. So the generic form of eq. (2) would be as in eq. (3) below:

$$Z = a R^b \quad (3)$$

The ITU-R P.838-3 recommends that the specific attenuation $\gamma_R$(dB/km) is obtained from the rain rate R (mm/hr) using the power-law relationship of eq. (4) below:

$$\gamma_R = k R^\alpha \quad (4)$$

Values for the coefficients k and α are determined by frequency dependent coefficients, the polarization angle and the elevation angle, as provided by the ITU-R P.838-3 recommendation. For f=20 GHz, circular polarization and any elevation, the above equation becomes represented in eq. (5) below:

$$\gamma_R = 0.072 R^{1.85} \quad (5)$$

Substituting eq. (1) into eq. (5) an expression for the specific attenuation as a function of the reflectivity in terms of dBZ as in eq (6) below:

$$\gamma_R\left(\frac{dB}{km}\right) = 0.072 \left(\frac{10^{(dBZ/10)}}{200}\right)^{1.156} \quad (6)$$

The generic form of eq. (6) will be the outcome of mathematical manipulation of eqs. (3) and (4) as in eq. (7) below:

$$\gamma_R\left(\frac{dB}{km}\right) = k \left(\frac{10^{(dBZ/10)}}{a}\right)^{a/b} \quad (7)$$

Attenuation Integral

The above expression should be calculated for each cell of radar measurement and multiplied by the cell size in km in order to obtain the attenuation per cell. Denote the i-th cell path length and specific attenuation by $l_i$ and $\gamma_{R_i}$ respectively. The total attenuation A (dB) can be expressed by eq. (8) below:

$$A = \Sigma_i l_i \gamma_{R_i} \quad (8)$$

In case of equal cell path length, where the number of cells is N and the total path length is L (km), the following expression is obtained by eq. (9) below:

$$A = \frac{L}{N} \sum_{i=1}^{N} \gamma_{R_i} \quad (9)$$

Substituting eq. (6) into eq. (9) the following Attenuation Integral is obtained as a function of the radar measurements of reflectivity $dBZ_i$ as in eq. (10) below:

$$A(dB) = \frac{L}{N} \sum_{i=1}^{N} 0.072 \left(\frac{10^{(dBZ_i/10)}}{200}\right)^{1.156} \quad (10)$$

In the generic form the Attenuation Integral will be expressed by $$A(dB) = \frac{L}{N} \sum_{i=1}^{N} k \left(\frac{10^{(dBZ_i/10)}}{a}\right)^{a/b} \quad (11)$$

According to further embodiment, following is a model calibration:

The parameters a and b in the form of the Z-R relation expressed in eq. (3) above are location and time dependent. This implies that the estimated Attenuation Integral will suffer from limited accuracy if we don't calibrate the model to reflect the actual conditions. We hereby propose a method for calibrating the model, namely estimating the parameters according to actual measured attenuation, in order to optimize the accuracy of the attenuation estimation.

The whole service territory will be partitioned into regions, preferably characterized by climate conditions similarity. Additionally, applying a Normalized Least Mean Square (NLMS) filter can be used to find the model parameters that minimize a cost function defined as the mean square error between the measured attenuation and the estimated attenuation. The measured attenuation is calculated based on SNR measurements performed by the terminals residing in this region and/or by the Hub.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A method comprising:
   receiving weather data related to a specified geographic area from at least one source comprising a weather radar transmitting radar signals;
   obtaining a position of at least one terminal located in said specified area and a position of a communication satellite being in communication via a communication link with said terminal;
   generating nowcasting predictions of weather conditions measure along at least one estimated future communication path between said communication satellite and said terminal, based on the received weather data and the obtained positions, wherein the generating comprises:
   defining the communication link as a three-dimensional vector passing through a plurality of cells along said at least one estimated future communication path;
   determining the cells affected by weather conditions as affected cells, and
   extracting the nowcasting predictions corresponding to the affected cells;
   converting the nowcasting predictions of weather conditions measure to corresponding predicted levels of signal attenuation in dB per length unit for each of the affected cells,
   wherein said converting is carried out using the following formula:

$$\gamma_R\left(\frac{dB}{km}\right) = k\left(\frac{10^{(dBZ/10)}}{a}\right)^{a/b}$$

wherein $\gamma_R$ represents the signal attenuation in dB per km for a specific rainfall rate R given in mm per hour and dBZ represents a meteorological measure of equivalent reflectivity Z of the radar signal reflected off a remote object, and wherein k, $\alpha$, a, and b are coefficients associated with the weather radar;
   calculating a predicted signal attenuation integral, based on said corresponding predicted levels of signal attenuation for each of the affected cells, each weighted by the corresponding cell path length, along said at least one estimated future communication path; and
   dynamically adjusting at least one communication characteristic of a communication link along said at least one estimated future communication path, according to the corresponding calculated predicted signal attenuation integral.

2. The method according to claim 1, wherein the at least one terminal comprises a plurality of terminals.

3. The method according to claim 2, wherein the dynamically adjusting of at least one communication characteristic is carried out only to at least one terminal whose predicted signal attenuation integral is beyond a predefined threshold.

4. The method according to claim 2, wherein the dynamically adjusting communication characteristics of communication links is further based on assessment of availability of resources in a network associated with the terminals.

5. The method according to claim 2, further comprising generating self-weather predictions based on analyzing signals measurements at the terminals over time, wherein the self-weather predictions are used at least as part of the obtained weather data.

6. The method according to claim 2, wherein the communication is broadcasting content from the satellite to the terminals, wherein some of the content is assigned with a specified quality level, and wherein the dynamically adjusting at least one communication characteristic, is carried out to the said content according to the specified quality level and the nowcasting predictions.

7. The method according to claim 1, wherein the dynamically adjusting at least one communication characteristic of communication links is reducing modulation and coding (ModCod) level.

8. The method according to claim 1, wherein the positions of at least one of: the at least one terminal, and the communication satellite are dynamic over time.

9. The method according to claim 1, wherein the communication satellite being in communication with said at least one terminal communicates over a Ka band channel.

10. The method according to claim 1, wherein the at least one source comprises at least one of: a weather satellite, and weather radar.

11. The method according to claim 1, wherein said nowcasting predictions relate to a future temporal interval defined between 0 to 60 minutes from current time.

12. The method according to claim 1, further comprising measuring actual signal attenuation over a return channel and validating the nowcasting predictions with the measured signal attenuation, to yield calibrated nowcasting predictions.

13. The method according to claim 1, wherein the communication is broadcasting from the satellite to the terminals, wherein some of the terminals are assigned with specified content at a specified region, and wherein the dynamically adjusting at least one communication characteristic, is carried out to the specified content based on the nowcasting predictions associated with the specified region.

14. The method according to claim 1, wherein the dynamically adjusting communication characteristics comprises adjusting at least one of: modulation, coding, and power.

15. A system comprising:
a weather collection module which receives weather data related to a specified geographic area from at least one source comprising a weather radar transmitting radar signals;
a position collection module which obtains a position of at least one terminal located in said specified area and a position of a communication satellite being in communication via a communication link with said terminal;
a nowcasting prediction module which generates nowcasting predictions of weather conditions measure along at least one estimated future communication path between said communication satellite and said terminal, based on the received weather data and the obtained positions, wherein the generating comprises:
defining the communication link as a three-dimensional vector passing through a plurality of cells along said at least one estimated future communication path;
determining the cells affected by weather conditions as affected cells, and
extracting the nowcasting predictions corresponding to the affected cells; and
a control center which converts the nowcasting predictions of weather conditions measure to corresponding predicted levels of signal attenuation in dB per length unit for each of the affected cells,
wherein said converting is carried out using the following formula:

$$\gamma_R\left(\frac{dB}{km}\right) = k\left(\frac{10^{(dBZ/10)}}{a}\right)^{a/b}$$

wherein $\gamma_R$ represents the signal attenuation in dB per km for a specific rainfall rate R given in mm per hour and dBZ represents a meteorological measure of equivalent reflectivity Z of the radar signal reflected off a remote object, and wherein k, α, a, and b are coefficients associated with the weather radar,
wherein the control center calculates a predicted signal attenuation integral, based on said corresponding predicted levels of signal attenuation for each of the affected cells, each weighted by the corresponding cell path length, along said at least one estimated future communication path, and
wherein the control center dynamically adjusts at least one communication characteristic of a communication link along said at least one communication path, according to the corresponding calculated predicted signal attenuation integral.

16. The system according to claim 15, wherein the at least one terminal comprises a plurality of terminals.

17. The system according to claim 16, wherein the dynamically adjusting communication characteristics of communication links is further based on assessment of availability of resources in a network associated with the terminals.

18. The system according to claim 15, wherein the dynamically adjusting of at least one communication characteristic is carried out only to at least one terminal whose predicted signal attenuation integral is beyond a predefined threshold.

19. The system according to claim 15, wherein the dynamically adjusting at least one communication characteristic of communication links is reducing modulation and coding (ModCod) level.

20. The system according to claim 15, wherein the positions of at least one of: the at least one terminal, and the communication satellite are dynamic over time.

* * * * *